US008880280B2

(12) United States Patent
Maas et al.

(10) Patent No.: US 8,880,280 B2
(45) Date of Patent: Nov. 4, 2014

(54) WRITING OF AN ABSOLUTE KILOMETER READING INTO A MEMORY ELEMENT, IN PARTICULAR OF A WIRELESS KEY

(75) Inventors: Stephan Maas, Ingolstadt (DE); Ingo Ledendecker, Buxheim (DE)

(73) Assignee: Audi Aktiengesellschaft, Ingolstadt (DE)

( * ) Notice: Subject to any disclaimer, the term of this patent is extended or adjusted under 35 U.S.C. 154(b) by 0 days.

(21) Appl. No.: 13/382,059

(22) PCT Filed: Jun. 26, 2010

(86) PCT No.: PCT/EP2010/003912

§ 371 (c)(1), (2), (4) Date: Jan. 3, 2012

(87) PCT Pub. No.: WO2011/000533

PCT Pub. Date: Jan. 6, 2011

(65) Prior Publication Data

US 2012/0109448 A1 May 3, 2012

(30) Foreign Application Priority Data

Jul. 3, 2009 (DE) ......................... 10 2009 033 040

(51) Int. Cl.
*G06F 19/00* (2011.01)
*G06F 7/00* (2006.01)
*G07C 5/08* (2006.01)

(52) U.S. Cl.
CPC .................................... *G07C 5/0858* (2013.01)
USPC ........ 701/32.5; 701/32.6; 701/33.3; 701/33.4

(58) Field of Classification Search
USPC .............. 701/1, 36, 67, 32.5, 32.6, 33.3, 33.4
See application file for complete search history.

(56) References Cited

U.S. PATENT DOCUMENTS

| | | | | |
|---|---|---|---|---|
| 5,924,057 | A * | 7/1999 | Kell | 702/165 |
| 6,519,516 | B2 * | 2/2003 | Pfaeffle et al. | 701/32.6 |
| 7,039,510 | B2 | 5/2006 | Gumpinger | |
| 7,610,128 | B2 * | 10/2009 | O'Connor et al. | 701/32.5 |
| 7,780,080 | B2 * | 8/2010 | Owen et al. | 235/382 |
| 8,271,161 | B2 * | 9/2012 | Meehan et al. | 701/33.4 |
| 2001/0021889 | A1 * | 9/2001 | Pfaeffle et al. | 701/35 |
| 2008/0294312 | A1 * | 11/2008 | O'Connor et al. | 701/35 |

FOREIGN PATENT DOCUMENTS

| | | | | |
|---|---|---|---|---|
| DE | 198 21 696 | A1 | | 11/1999 |
| DE | 199 19 501 | A1 | | 6/2000 |
| DE | 102 22 141 | A1 | | 11/2003 |
| DE | 10 2006 041765 | A1 | | 3/2008 |
| DE | 102006041765 | B4 | * | 7/2008 |
| EP | 1 283 408 | A2 | | 2/2003 |

* cited by examiner

*Primary Examiner* — Fadey Jabr
*Assistant Examiner* — Thomas Ingram
(74) *Attorney, Agent, or Firm* — Henry M. Feiereisen LLC

(57) ABSTRACT

The invention relates to a method for transmitting vehicle data in the form of kilometer readings of a motor vehicle (1) to a memory element (7) having a counter, which memory element is removable from the motor vehicle. At time intervals, the kilometer reading of the motor vehicle is transmitted to the memory element (7), and after each kilometer reading transmission, the difference between the last transmitted and the newly transmitted kilometer reading is added up in the counter.

5 Claims, 2 Drawing Sheets

WRITING OF AN ABSOLUTE KILOMETER READING INTO A MEMORY ELEMENT, IN PARTICULAR OF A WIRELESS KEY

CROSS-REFERENCES TO RELATED APPLICATIONS

This application is the U.S. National Stage of International Application No. PCT/EP2010/003912, filed Jun. 26, 2010, which designated the United States and has been published as International Publication No. WO 2011/000533 A1 and which claims the priority of German Patent Application, Serial No. 10 2009 033 040.2, filed Jul. 3, 2009, pursuant to 35 U.S.C. 119(a)-(d).

BACKGROUND OF THE INVENTION

The invention relates to a method for transmitting vehicle data of a motor vehicle to a memory element, which can be removed from the motor vehicle, wherein the vehicle data are transmitted to the memory element and stored in the memory element at least twice during the course of a drive.

It is known to transmit vehicle data to a removable memory element and to store the vehicle data on the memory element. DE 199 19 501 A1 discloses to store operation-dependent vehicle data in a vehicle key having a transponder. The operation-dependent data are transmitted to the key by the electronic display unit via the electronic immobilizing system and stored in a memory element of the key.

Further, it is known from DE 102 22 141 A1 to wirelessly transmit vehicle data to a memory medium for storage. At the beginning of travel, the vehicle data are transmitted from the motor vehicle to the storage medium and, as soon as new error data are detected during travel, either transmitted immediately or stored in a buffer memory. At the end of travel, changes of and/or additions to the data stored in the memory at the beginning of the drive are executed.

DE 10 2006 041 765 B4 discloses a method in which a kilometer reading of a motor vehicle is transmitted to a memory element, and stored in the memory element, wherein only a kilometer reading which is greater than the last stored kilometer reading can be stored.

During the drive, the kilometer reading is transmitted at defined intervals to the memory element in the wireless key, where it is only stored however when the received value exceeds the one which was stored last. This means that smaller kilometer readings, for instance as a result of a manipulation on the vehicle, are not registered in the key. As a result, after manipulation involving a turning back of the kilometer reading, this kilometer reading is recorded only in the vehicle but not in the key.

As the kilometer reading is stored in the vehicle but not in the key following a turning back of the kilometer reading, a difference exists between the key kilometer reading and the vehicle kilometer reading for a period of time, allowing detection of the manipulation. After a certain time however, the vehicle kilometer reading catches up with the key kilometer reading again, and a manipulation is no longer detectable.

DE 198 21 696 A1 discloses a method for the transfer and storage of information, which is established by a number of time sequential pulses, especially of a distance traveled by the vehicle, in which method a counter unit counts incoming pulses, the number of pulses which is present after a predetermined period of time is transferred to the receiver unit in encrypted form according to an encryption algorithm, the decoded number, which is decoded according to the same encryption algorithm, is determined in the receiver unit, and the sum of all numbers is stored.

DE 199 19 501 B4 describes a device for storing operation-dependent vehicle data in a removable memory element.

The object of the present invention is therefore to improve a method of the type mentioned above such as to protect the memory unit against a manipulation of the kilometer reading.

SUMMARY OF THE INVENTION

This object is solved by the inventions set forth in the independent claims. Advantageous refinements are set forth in the dependent claims.

In a method for transmitting vehicle data in the form of kilometer readings of a motor vehicle to a memory element which has a counter and is removable from the motor vehicle, the kilometer reading of the motor vehicle is transmitted at time intervals from the motor vehicle to the memory element and, after transmission of the kilometer reading, the difference between the last transmitted and the newly transmitted kilometer reading is added up in the counter.

In the memory element, which in particular is the memory element of a key and/or wireless key, thus exists a counter for the absolute kilometer reading, to which the difference between the last kilometer reading and the new kilometer reading is continuously added. In the event, the kilometer reading in the vehicle is turned back and transmitted to the key, the turned-back smaller value is set as the old value. At the next recording of the kilometer reading, the difference between the old and new kilometer reading is added again to the absolute kilometer reading.

Thus, in the event the newly transmitted kilometer reading is smaller than the last transmitted kilometer reading, the difference is not added to the absolute kilometer reading but the newly transmitted kilometer reading is merely set as basis for the next calculation of the difference. The occurrence of this event is irreversibly recorded in the key.

The difference is not added up, since it would be negative in the described case. The possible missing of or non-inclusion of the difference during the manipulation is accepted, but the occurrence of the manipulation is stored.

Adding up the difference of old and new kilometer readings creates a virtually absolute odometer in the key. Additionally, this method allows registration of kilometers traveled after the manipulation. Thus, a manipulation of the kilometer reading in the vehicle has no effect on the kilometer reading in the key. Therefore, after manipulation, the vehicle has a lower kilometer reading than the key.

The method for the transmission of the vehicle data can include in particular at the beginning of travel the following steps: turning on the ignition, waiting for a delay period after turning on the ignition and/or until exceeding a parametrizable/predetermined speed, transmitting the vehicle data to the memory element after meeting these criteria, and transmitting the vehicle data to the memory element for a predetermined change in the kilometer reading as well as storing of the vehicle data in the memory element.

The memory element is preferably linked to a vehicle authorization element as well as to an ignition key or a chip card. However, the memory element can also be another different memory element which can be removed again from the vehicle.

Preferably, the vehicle data are stored in an encrypted manner in the memory element. It is particularly preferred to encrypt the vehicle data in the motor vehicle and to transmit them in encrypted form to the memory element. The vehicle data are decoded again during or after reading of the vehicle data.

The transmission of the vehicle data can be established via a conventional vehicle authorization element with immobilizer and a transponder, referred to as basic mode, as well as via keyless mode. The keyless mode can occur for example via LF, Bluetooth, Infrared, or RF. In the keyless mode, the vehicle authorization element merely has to be present inside the vehicle, or vehicle interior, to communicate with the control device of the vehicle authorization.

For reasons of theft protection and data protection it is preferred to render selected vehicle data writeable and/or readable only when the memory element has been authenticated. Authentication takes place between the memory element and an immobilizer-control device of the vehicle.

Other information stored in the memory element can include one or more of the following items of information: Date, time, oil level, oil inspection interval data, maintenance interval data, wear data (e.g. brake lining), tank content, amount of consumed fuel, vehicle speed.

Further, conditions, which identify an active error status or a warning in the vehicle are also recorded and transmitted.

A storing process can be initiated by the occurrence of pre-determined trigger events. Beside the afore-mentioned storage at the start of travel and the storage in case of a pre-determined change of the kilometer reading, the trigger events preferably also include the occurrence of an error message of a control device. To be able to trace the origin of an error message or warning, the status of the error message and warning is kept up-to-date in a control device, for example in the immobilizer-control device. Registration of an additional error message compared to the last storage of the error message is an event trigger which triggers a new storing process.

Further, the transmission of the vehicle data can also be initiated by a command of the driver, for example by pushing a button.

Preferably, only the current status of the information is stored. Additionally, a storing process preferably includes the storing of all vehicle data. In a particularly preferred embodiment, the required storage memory in the memory element is reserved in duplicate such that two blocks of data exist. The vehicle data are then alternately written into one of the blocks, depending on the success of the last writing. There is a high probability that at least one valid, even though outdated, block of vehicle data exists in the memory element.

The data security can be ensured in a conventional manner by calculating a check sum over the entire vehicle data, even when a storing process should be interrupted.

A memory element is configured in particular to carry out one of the previously described methods.

BRIEF DESCRIPTION OF THE DRAWING

Further advantages and details of the invention follow from the embodiments described below as well as from the drawings. It shows FIG. 1 a device for carrying out a method involving transmission of vehicle data in the form of kilometer readings.

DETAILED DESCRIPTION OF PREFERRED EMBODIMENTS

Figure 1:
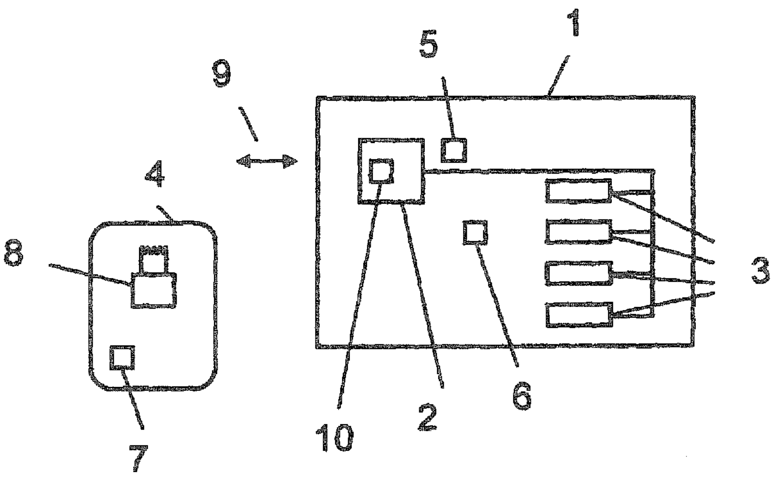

FIG. 1 shows a schematic representation of a motor vehicle 1. The motor vehicle 1 includes an immobilizer-control device 2 and a number of control devices 3, which are controlled by the immobilizer-control device 2. The motor vehicle 1 can be operated in a basic mode in which a key 4 is inserted in the ignition lock 5, and in keyless mode in which a key 4 only has to be present inside the motor vehicle 1 or in the vehicle interior. In the keyless mode, the motor vehicle 1 is started by pushing a button (pressure starter 6).

Vehicle data containing the kilometer reading are provided by the immobilizer-control device 2 and, after occurrence of a trigger event, transferred to the key 4 and stored in the memory element 7 in the key 4. In the basic mode, the transmission of the vehicle data from the immobilizer-control device 2 to the key 4 is implemented by a transponder 8 of the key 4 and a corresponding transponder of the ignition lock 5. In the keyless mode, the transmission is implemented via LF (low frequency), Bluetooth or RF 9. The vehicle data are stored temporarily in a memory element 10 of the immobilizer-control device 2.

The key 4 includes therein a counter for the absolute kilometer reading, to which the difference between the last kilometer reading and the new kilometer reading is added at all times. When the kilometer reading is turned back in the vehicle 1 and transmitted to the key, the turned-back, smaller value is set as old value. When writing the next kilometer reading, the difference between the old and new kilometer reading is then added again to the absolute kilometer reading.

Figure 2:
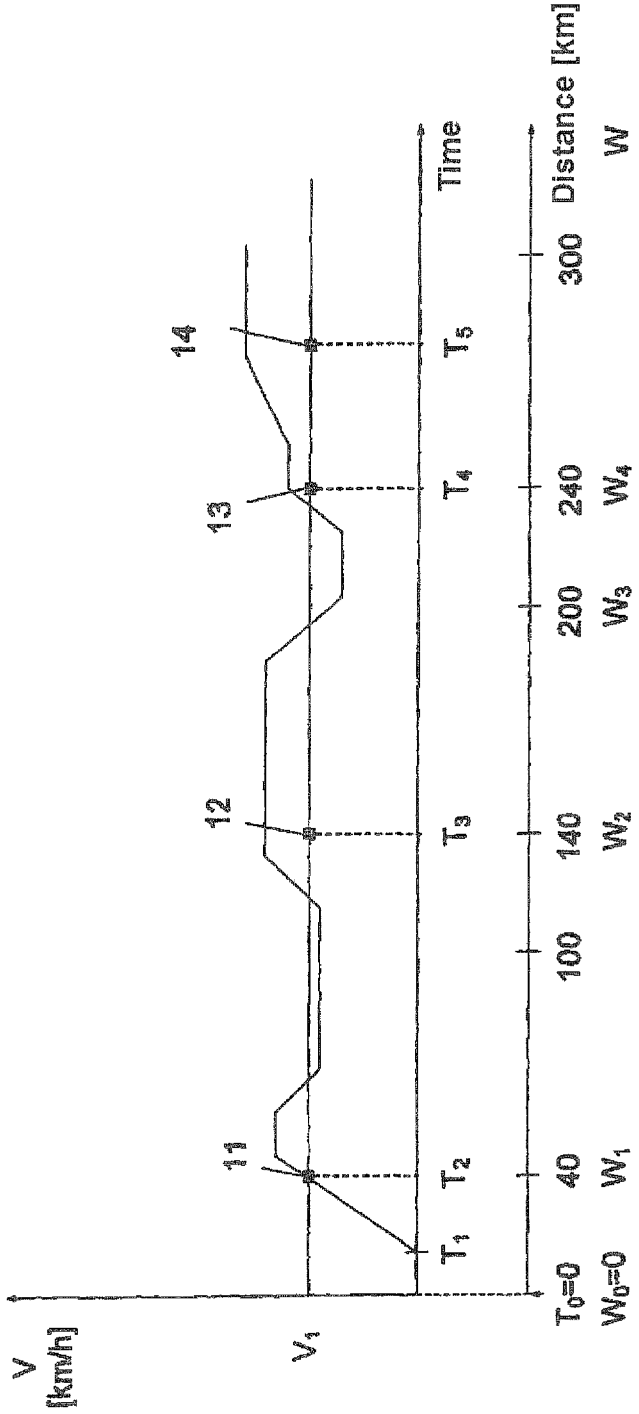
FIG. 2 an illustration of the method.

In FIG. 2, some of the trigger events are explained in more detail. FIG. 2 shows a diagram of the speed of a motor vehicle as a function of time. The method for the transmission of the vehicle data at the start of travel commences when the ignition is switched on (basic mode or keyless mode) at the time $T_0=0$. After a lag time t, a first time trigger becomes active. The first storing however, still waits until a parametrizable or predetermined speed $V_1$ is exceeded, and only, when the speed-trigger is also active, at the time $T_2$, a storing process 11 is initiated and the vehicle data are transmitted to the memory element 7. By transmitting the vehicle data to the memory element 7 for each predetermined change in the kilometer reading and storing them on the memory element 7, a delta-kilometer reading trigger, becomes active after a delta-kilometer reading, in this case 100 km, and a second storing process 12 is initiated. In this example, the first storing process 11 takes place at $W_1=40$ km, and the second storing process 12 takes place 100 km later at $W_2=140$ km. To avoid a termination of the ongoing storing process, it is preferred to initiate a storing process only at a speed greater than a threshold speed $V_1$. For example, $V_1$ may constitute a speed in the order of 20 km/h. That means that the delta-kilometer reading as well as the speed-trigger must have the status "active", before a delta-kilometer reading storing process is initiated. A further storing process 13 is triggered by the kilometer reading trigger when $T=T_4$ and $W=W_4=240$. When $T=T_5$, a warning-trigger becomes active and again triggers a storing process 14.

The invention claimed is:

1. A method for the transmission of vehicle data in form of kilometer readings of a motor vehicle, said method comprising:

- periodically transmitting by a transponder kilometer readings of the motor vehicle to a memory element during operation of the vehicle and storing the kilometer readings on the memory element, said memory element being removable form the motor vehicle;
- determining by a control device a difference between a first one of the kilometer readings and a second one of the kilometer readings transmitted subsequent to the first kilometer reading;

when said difference is positive, adding up said difference in a counter of the memory element, and when said difference is negative setting the second kilometer reading as the first kilometer reading and repeating the determining step; and storing in the memory element a kilometer reading resulting from adding up said difference.

2. The method of claim 1, wherein the vehicle data are transmitted by using at least one member selected from the group consisting of a transponder and a LF-connection.

3. The method of claim 1, wherein the vehicle data received by the memory element are readable or writeable only after authentication.

4. A memory element for storing kilometer readings of a motor vehicle, comprising:

a receiving member for receiving the kilometer readings of the motor vehicle during operation of the motor vehicle; and a counter configured to add up a difference between a first one of the kilometer readings and a second one of the kilometer readings transmitted subsequent to the first kilometer reading when the difference between the first and second kilometer readings is positive, and to set the second kilometer reading as the first kilometer reading when the difference is negative, said memory element being configured to store a kilometer reading resulting from adding up said difference.

5. A vehicle key, comprising a memory element for storing kilometer readings of a motor vehicle, said memory element including a receiving member for receiving the kilometer readings of the motor vehicle during operation of the motor vehicle, and a counter configured to add up a difference between a first one of the kilometer readings and a second one of the kilometer readings transmitted subsequent to the first kilometer reading when the difference between the first and second kilometer readings is positive, and to set the second kilometer reading as the first kilometer reading when the difference is negative, said memory element being configured to store a kilometer reading resulting from adding up said difference.

* * * * *